(12) United States Patent
Lee

(10) Patent No.: US 11,501,761 B2
(45) Date of Patent: Nov. 15, 2022

(54) METHOD AND APPARATUS FOR SPEECH RECOGNITION

(71) Applicant: Samsung Electronics Co., Ltd., Suwon-si (KR)

(72) Inventor: Min-Joong Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 102 days.

(21) Appl. No.: 16/787,701

(22) Filed: Feb. 11, 2020

(65) Prior Publication Data

US 2020/0320983 A1 Oct. 8, 2020

(30) Foreign Application Priority Data

Apr. 5, 2019 (KR) .......... 10-2019-0040120
Nov. 7, 2019 (KR) .......... 10-2019-0141750

(51) Int. Cl.
| | | |
|---|---|---|
| *G10L 15/00* | (2013.01) | |
| *G10L 15/16* | (2006.01) | |
| *G06N 3/04* | (2006.01) | |
| *G06N 3/08* | (2006.01) | |
| *G10L 15/197* | (2013.01) | |
| *G10L 15/22* | (2006.01) | |

(52) U.S. Cl.
CPC ............ *G10L 15/16* (2013.01); *G06N 3/0454* (2013.01); *G06N 3/088* (2013.01); *G10L 15/197* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 9,286,883 B1 | 3/2016 | Ayrapetian et al. | |
| 9,378,735 B1 | 6/2016 | Garimella et al. | |
| 9,842,592 B2 * | 12/2017 | Biadsy | G10L 15/26 |
| 9,990,918 B1 | 6/2018 | Chan et al. | |
| 10,170,112 B2 * | 1/2019 | Gruenstein | G10L 15/08 |
| 2009/0030692 A1 | 1/2009 | Deligne et al. | |
| 2009/0076815 A1 | 3/2009 | Ichikawa et al. | |
| 2011/0208521 A1 | 8/2011 | McClain | |
| 2014/0379345 A1 | 12/2014 | Chung et al. | |

(Continued)

FOREIGN PATENT DOCUMENTS

| | | |
|---|---|---|
| JP | 2017-219769 A | 12/2017 |
| JP | 2018-136493 A | 8/2018 |

(Continued)

OTHER PUBLICATIONS

Extended European Search Report dated Jul. 17, 2020 in corresponding European Patent Application No. 20165895.2 (10 pages in English).

(Continued)

*Primary Examiner* — Satwant K Singh
(74) *Attorney, Agent, or Firm* — NSIP Law

(57) ABSTRACT

A speech recognition method includes adding a preset special sequence to a front end of an input sequence that corresponds to an input utterance of a speaker, recognizing the preset special sequence and the input sequence, and recognizing the input sequence based on the preset special sequence and a speech recognition result obtained by recognizing the preset special sequence and the input sequence.

33 Claims, 11 Drawing Sheets

(56) References Cited

U.S. PATENT DOCUMENTS

| | | |
|---|---|---|
| 2015/0039301 A1 | 2/2015 | Senior et al. |
| 2016/0372119 A1 | 12/2016 | Sak et al. |
| 2017/0316775 A1* | 11/2017 | Le ..................... G06F 16/3329 |
| 2018/0053502 A1* | 2/2018 | Biadsy ................... G10L 15/18 |
| 2018/0056502 A1* | 3/2018 | Lohmeier ................ B25J 19/06 |
| 2018/0068661 A1 | 3/2018 | Printz |
| 2018/0075343 A1 | 3/2018 | Van den Oord et al. |
| 2018/0174576 A1 | 6/2018 | Soltau et al. |
| 2018/0204569 A1 | 7/2018 | Nadkar et al. |
| 2018/0247643 A1 | 8/2018 | Battenberg et al. |
| 2018/0261225 A1 | 9/2018 | Watanabe et al. |
| 2018/0365554 A1 | 12/2018 | Van den Oord et al. |
| 2019/0043527 A1 | 2/2019 | Georges et al. |
| 2019/0156828 A1* | 5/2019 | Gruenstein ......... H04L 63/1458 |
| 2020/0357400 A1* | 11/2020 | Gruenstein ......... H04L 63/1425 |
| 2021/0020170 A1* | 1/2021 | Biadsy ................. G10L 15/197 |

FOREIGN PATENT DOCUMENTS

| | | |
|---|---|---|
| KR | 10-2015-0043108 A | 4/2015 |
| KR | 10-1610161 B1 | 4/2016 |
| KR | 10-2016-0110085 A | 9/2016 |

OTHER PUBLICATIONS

Hinton et al., "Deep Neural Networks for Acoustic Modeling in Speech Recognition," IEEE Signal Processing Magazine, Nov. 2012, 16 pages.

Chan et al., "Listen, Attend and Spell," 2015, 16 pages.

Bahdanau et al., "End-To-End Attention-Based Large Vocabulary Speech Recognition," 2016, 8 pages.

Dong, Linhao, et al., "Speech-Transformer: A No-Recurrence Sequence-To-Sequence Model for Speech Recognition," Institute of Automation, Chinese Academy of Sciences, 2015, (5 pages in English).

"Changes in speech recognition technology and cutting-edge End-to-end model by deep learning," Tatsuya Kawahara School of Informatics, Kyoto University, Kyoto, (2 pages in English and 7 pages in Japanese).

Japanese Office Action dated May 10, 2022, in counterpart of Japanese Patent Application No. 2020-067912 (3 Pages in English, 7 Pages in Japanese).

* cited by examiner

210 where are you 0.1  0.2  0.3  0.4  0.5  0.6  0.7(s)

~0.1s : hi bixby
~0.2s : hi galaxy
~0.3s : turn on
~0.4s : where
~0.5s : where are
~0.6s : where are you
~0.7s : where are you

220 hi      where are you 0.1  0.2  0.3  0.4  0.5  0.6  0.7(s)

~0.1s : hi
~0.2s : hi
~0.3s : hi
~0.4s : hi where
~0.5s : hi where are
~0.6s : hi where are you
~0.7s : hi where are you

510 breaking news today prime mini.... Head 1 where are you  Head 2

0.1  0.2  0.3  0.4  0.5  0.6  0.7 (s)

~0.1s : hi bixby
~0.2s : breaking
~0.3s : breaking news
~0.4s : breaking news to
~0.5s : breaking news today
~0.6s : breaking news today prime
~0.7s : breaking news today prime mini

520

~0.1s : hi
~0.2s : hi
~0.3s : hi
~0.4s : hi where
~0.5s : hi where are
~0.6s : hi where are you
~0.7s : hi where are you

METHOD AND APPARATUS FOR SPEECH RECOGNITION

CROSS-REFERENCE TO RELATED APPLICATIONS

This application claims the benefit under 35 USC § 119(a) of Korean Patent Application No. 10-2019-0040120 filed on Apr. 5, 2019, and Korean Patent Application No. 10-2019-0141750 filed on Nov. 7, 2019, in the Korean Intellectual Property Office, the entire disclosures of which are incorporated herein by reference for all purposes.

BACKGROUND

1. Field

The following description relates to a speech recognition method and apparatus, and more particularly, to a speech recognition method for prevention of an output of noise and focusing on an utterance of a main speaker in an end-to-end artificial neural network-based speech recognition system.

2. Description of Related Art

Speech recognition refers to technology used to recognize or understand an acoustic speech signal such as a vocal expression uttered by a human user by analyzing the acoustic speech signal by a computing device. A method of recognizing an utterance using a frequency characteristic or feature extracted from audio data has been mainly used in related arts, and a hidden Markov model (HMM) has been mainly applied to this method. Such HMM-based speech recognition method may recognize an utterance by analyzing a pronunciation from audio data, and combining words or sentences based on the analyzed pronunciation.

As deep learning-based machine learning has been further developed, research is conducted actively on end-to-end speech recognition technology that may directly recognize a text including a word or a sentence from audio data using an acoustic model including an artificial neural network, without analyzing a pronunciation from the audio data.

However, an end-to-end artificial neural network-based speech recognition system using the technology may perform decoding in real time on a phoneme-by-phoneme basis, and output an unexpected text even in a white noise interval in which there is no utterance of a user, due to forced speech recognition.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a speech recognition method includes adding a preset special sequence to a front end of an input sequence that corresponds to an input utterance of a speaker, recognizing the preset special sequence and the input sequence using an artificial neural network, and recognizing the input sequence based on the preset special sequence and a speech recognition result obtained by recognizing the preset special sequence and the input sequence.

The input sequence may include the input utterance or vectors extracted from the input utterance.

The preset special sequence may include a preset utterance of the speaker, or at least one vector extracted from the preset utterance.

The preset special sequence may be a preset utterance of the speaker.

The preset special sequence may be "hi."

The recognizing of the special sequence and the input sequence may include generating an encoded feature by encoding the preset special sequence and the input sequence, outputting at least one special token that corresponds to the preset special sequence based on the encoded feature, and determining at least one output token that corresponds to the input sequence based on the encoded feature and the special token.

The special token may include a text corresponding to the preset utterance of the speaker.

The recognizing of the preset special sequence and the input sequence may include generating an encoded feature by encoding the preset special sequence and the input sequence, and determining at least one output token that corresponds to the input sequence based on the encoded feature and a special token that corresponds to the preset special sequence.

The recognizing of the preset special sequence and the input sequence may include outputting the speech recognition result that corresponds to the preset special sequence and the input sequence by inputting the preset special sequence and the input sequence to an end-to-end artificial neural network of an encoder-decoder architecture.

A decoder of the end-to-end artificial neural network may output the speech recognition result dependent on a speech recognition result from previous steps based on information calculated from an encoder of the end-to-end artificial neural network in each step.

The artificial neural network may include one or more of a recurrent neural network (RNN), a convolutional neural network (CNN), and a self-attention neural network (SANN).

The recognizing of the input sequence may include excluding a speech recognition result that corresponds to the preset special sequence from the speech recognition result that corresponds to the preset special sequence and the input sequence.

The preset special sequence may include at least one feature vector extracted from a portion of the preset utterance of the speaker. The recognizing of the preset special sequence and the input sequence may include generating an encoded feature by inputting the preset special sequence and the input sequence to the end-to-end artificial neural network that has an encoder-decoder architecture, and outputting a special token that corresponds to the feature vector based on the encoded feature. The artificial neural network may be trained to output the special token in response to the feature vector being input.

In a case in which the input sequence includes only noise, the speech recognition method may further include recognizing the input sequence subsequent to the preset special sequence as an end of state (EOS) token.

In another general aspect, a speech recognition apparatus may include a processor configured to add a preset special sequence to a front end of an input sequence that corresponds to an input utterance of a speaker, recognize the preset special sequence and the input sequence using an artificial neural network, and recognize the input sequence based on the preset special sequence and a speech recognition result obtained by recognizing the preset special sequence and the input sequence.

The input sequence may include the input utterance, or vectors extracted from the input utterance.

The preset special sequence may include a preset utterance of the speaker, or at least one vector extracted from the preset utterance.

The processor may generate an encoded feature by encoding the preset special sequence and the input sequence, output a special token that corresponds to the preset special sequence based on the generated encoded feature, and determine at least one output token that corresponds to the input sequence based on the encoded feature and the special token.

The special token may include a text that corresponds to the preset utterance of the speaker.

The processor may generate an encoded feature by encoding the preset special sequence and the input sequence, and determine at least one output token that corresponds to the input sequence based on the generated encoded feature and a special token that corresponds to the preset special sequence.

The processor may input the preset special sequence and the input sequence to an end-to-end artificial neural network that has an encoder-decoder architecture, and output the speech recognition result that corresponds to the preset special sequence and the input sequence.

A decoder of the end-to-end artificial neural network may output the speech recognition result dependent on a speech recognition result from previous steps based on information calculated from an encoder of the end-to-end artificial neural network in each step.

The artificial neural network may include one or more of an RNN, a CNN, and an SANN.

The processor may exclude a speech recognition result that corresponds to the preset special sequence from the speech recognition result that corresponds to the preset special sequence and the input sequence.

The preset special sequence may include at least one feature vector extracted from a portion of the preset utterance of the speaker, and the processor may generate an encoded feature by inputting the preset special sequence and the input sequence to the encoder of the end-to-end artificial neural network that has an encoder-decoder architecture, and output a special token that corresponds to the feature vector based on the encoded feature. The artificial neural network may be trained to output the special token in response to the feature vector being received.

In a case in which the input sequence only includes noise, the processor may recognize the input sequence subsequent to the preset special sequence as an EOS token.

In another general aspect, a processor-implemented speech recognition method includes extracting a feature vector from an utterance that includes an input utterance and a special utterance that is added prior to the input utterance; encoding the feature vector to generate an encoded feature; and determining an output token based on the encoded feature and a previously determined recognition result.

The processor-implemented speech recognition method may include outputting a special token that corresponds to the special utterance as the output token.

The processor-implemented speech recognition method may include decoding an input token and the encoded feature to output the special token.

The processor-implemented speech recognition method may include removing the special token from a recognition result that includes the special utterance; and outputting a current recognition result that only corresponds to the input utterance.

The processor-implemented speech recognition method may include predicting probabilities of candidates for a subsequent output token based on the special token; determining the subsequent output token based on the probabilities; and determining the subsequent output token to be a subsequent input token.

Encoding the feature vector may include transforming a dimension of the feature vector to generate the encoded feature.

Other features and aspects will be apparent from the following detailed description, the drawings, and the claims.

Figure 1:
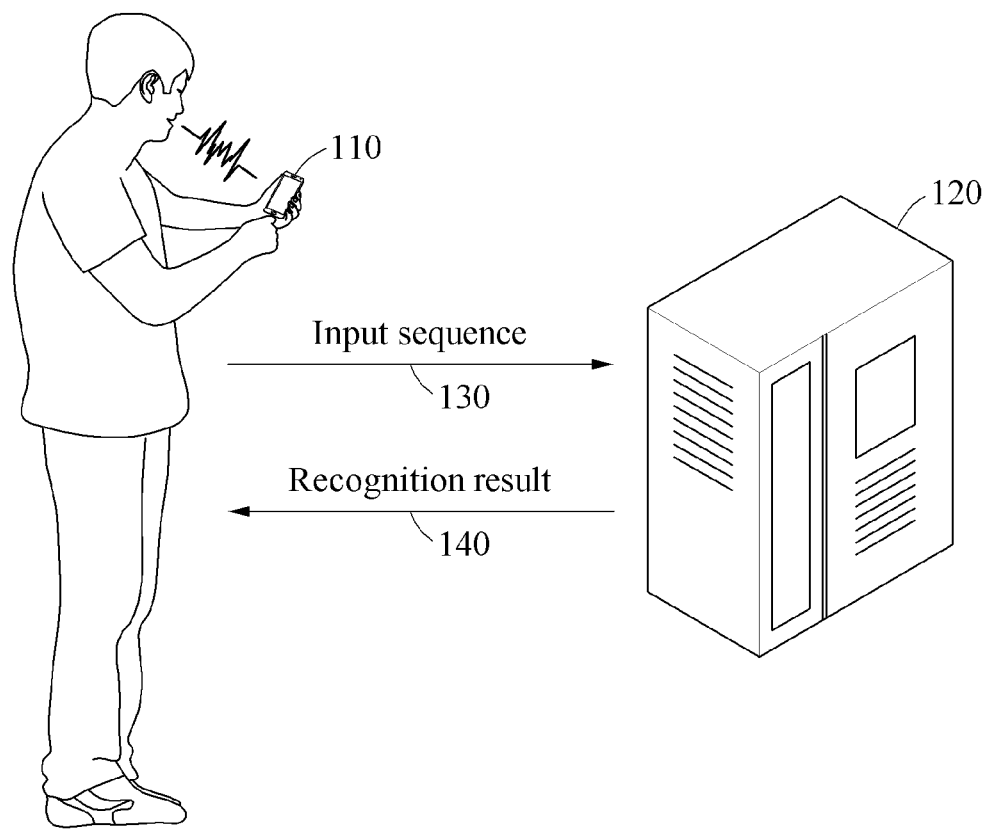
FIG. 1 illustrates an example of a speech recognition system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates an example of a speech recognition system.

Referring to FIG. 1, a speech recognition system includes a user terminal 110 and a speech recognition apparatus 120. However, components of the speech recognition system illustrated in FIG. 1 may be functional elements classified by their functionalities, and one or more of the components may be embodied in an integral form in an actual physical environment. For example, although the speech recognition apparatus 120 is illustrated as a type of server in FIG. 1, each function of the speech recognition apparatus 120 may be embedded in the user terminal 110 according to examples.

The user terminal 110 of the speech recognition system is a terminal configured to receive a speech or utterance sequence (input sequence) 130 from a user or a speaker and transfer the received utterance sequence 130 to the speech recognition apparatus 120, and provide the user with a recognition result 140 obtained by the speech recognition apparatus 120. Although the user terminal 110 is illustrated as a smartphone in FIG. 1, the user terminal 110 may be embodied as other devices.

The speech recognition apparatus 120 of the speech recognition system is a computing device configured to receive the input sequence 130 of the speaker and provides the recognition result 140. The input sequence 130 includes an input utterance and an input utterance feature vector extracted from the input utterance. The input utterance may be a comprehensive utterance or vocal expression uttered by a user or a speaker that encompasses a wave file in which an input utterance signal of the speaker is represented by a wave type, a spectrogram in which a wave file is represented by a frequency from, a Mel-frequency cepstral coefficient (MFCC), and the like. The computing device may include, for example, a laptop computer, a desktop computer, a smartphone, and the like. However, examples of the computing device are not limited to the examples described in the foregoing, and the computing device may include all types of device including an operation or calculation means.

The speech recognition apparatus 120 is configured to provide end-to-end speech recognition. In related arts, for speech recognition, a hidden Markov model (HMM) is mainly used. Such HMM-based speech recognition method may analyze pronunciation from audio data, and combine words or sentences based on the analyzed pronunciation. However, pronunciation may vary for each speaker and type of language, and thus such method of analyzing pronunciation and recognizing an utterance may need to involve corrections through numerous trials and errors. In addition, the HMM-based speech recognition method may be vulnerable to ambient noise because it recognizes an utterance based on pronunciation.

In contrast, an end-to-end artificial neural network-based speech recognition system may have a high level of performance because the neural network learns modeling necessary parts while minimizing the intervention of expertise in signal processing, pronunciation conversion, language model, and decoding that are needed for existing speech recognition.

To provide the end-to-end speech recognition, the speech recognition apparatus 120 is configured to construct an acoustic model including the artificial neural network, and provide the recognition result 140 in response to the input sequence 130 using the constructed acoustic model. The artificial neural network may be, for example, a recurrent neural network (RNN), a convolution neural network (CNN), a self-attention neural network (SANN), a bidirectional RNN (BRNN), a long short-term memory (LSTM) network, a bidirectional LSTM (BLSTM) network, a gated recurrent unit (GRU), a bidirectional GRU (BGRU), and the like. However, examples of the artificial neural network are not limited to the examples described in the foregoing.

In addition, the speech recognition apparatus 120 is configured to perform the speech recognition by adding a preset special sequence corresponding to the speaker to a front end of the input sequence 130 corresponding to the input utterance of the speaker. Further, the speech recognition apparatus 120 is configured to perform autoregressive decoding by which, to calculate an output of an undefined length by the artificial neural network, a previous output of the artificial neural network is used as an input to calculate a subsequent output for each token which is a unit configuring a sequence. Thus, the speech recognition apparatus 120 may prevent an output of noise, and focus on an utterance of a main speaker. Examples of input and output data of the speech recognition apparatus 120 will be briefly described hereinafter with reference to FIGS. 2A and 2B.

Figure 2A:
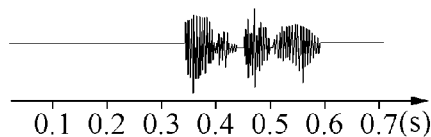
FIGS. 2A and 2B illustrate an example of preventing noise from being output in an interval in which there is no utterance.
Figure 2B:
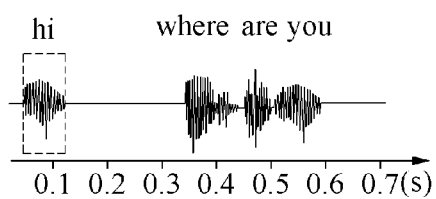

FIGS. 2A and 2B illustrate an example of preventing noise from being output in an interval in which there is no utterance.

Before describing a speech recognition method according to an example, a general end-to-end artificial neural network-based speech recognition method will be briefly described with reference to what is illustrated by a reference numeral 210 in FIG. 2A. An input sequence of a speaker includes an utterance of the speaker, for example, "where are you," from one point in an interval from 0.3 second (s) to 0.4 s. An interval from 0 s to 0.3 s is an interval in which there is no utterance by the speaker, and thus a speech recognition apparatus may be supposed to output indicating no utterance in the interval. However, a general end-to-end artificial neural network-based speech recognition system may perform decoding on each phoneme in real time and perform forced speech recognition in a noise interval without an utterance of a user, and accordingly output an unexpected text.

When there is only noise without an actual utterance, a general end-to-end artificial neural network may not output a result indicating that there is no utterance, but output a result most similar to a characteristic of noise. For example, the general end-to-end artificial neural network may output "hi bixby" in an interval from 0 s to 0.1 s, "hi galaxy" in an interval from 0 s to 0.2 s, and "turn on" in an interval from 0 s to 0.3 s.

To resolve such an issue, a method of learning noise data may be needed. However, the method may additionally need the noise data, and have its limit in that it may not be able to learn all types of noise.

Referring to what is illustrated by a reference numeral 220 in FIG. 2B, the speech recognition apparatus may perform speech recognition by adding a preset special sequence to a front end of an input sequence of a speaker, and thus prevent an output of noise and focus on an utterance of a main speaker based on a characteristic of autoregressive decoding in which a previous output token affects a determination of a subsequent output token. The speech recognition apparatus adds an utterance of the speaker corresponding to the preset special sequence corresponding to the speaker, for example, "hi," to the front end of an utterance corresponding to the input sequence of the speaker, for example, "where are you." The special sequence is a sequence forcefully added to a front end of an input utterance for speech recognition, which is different from an input utterance that is actually uttered by the speaker, and includes a pre-obtained special utterance of the speaker that is clearly recognizable by the speech recognition apparatus, or a special feature vector extracted from the special utterance of the speaker. For example, the speech recognition may be divided into a registration process and a test process, and the special sequence may be obtained in advance in the registration process, and automatically added to the front end of the input utterance of the speaker in the test process.

In the test process, the speech recognition apparatus may receive the special sequence, and output a recognition result, for example, "hi." The speech recognition apparatus may be affected by autoregressive decoding, and thus the recognition result "hi" in response to the special sequence may affect a subsequent output and the subsequent output may focus on an utterance of the speaker uttering "hi." Thus, only a token having a characteristic of the utterance of the speaker may be output. Hereinafter, a decoding method will be described in detail with reference to FIGS. 4A and 4B, and 5A and 5B.

As described above, the general end-to-end speech recognition system may fail to output the result indicating that there is no utterance in the interval from 0 s to 0.3 s, and output the result most similar to a characteristic of noise. In contrast, as illustrated by reference numeral 220, the speech recognition apparatus may not additionally recognize an output in a noise interval in the input sequence after "hi" which is a recognition result in response to the special sequence, because the recognition result "hi" affects a subsequent output. Subsequently, the speech recognition apparatus may remove the recognition result "hi" from "where are you," and finally output only "where are you." Thus, the speech recognition apparatus may prevent an output of noise simply using a special sequence, and focus on an utterance of a main speaker.

Although a special sequence has been described above as corresponding to a speaker, the special sequence may not necessarily be a special utterance of the speaker. For example, an utterance of a speaker corresponding to a special sequence "hi" may be replaced with an average utterance "hi" or an arbitrary utterance "hi." Although such effect of focusing on a main speaker may be slightly reduced, an effect of not additionally recognizing an output of a noise section may still be obtained even by using a special sequence not corresponding to the speaker.

Figure 3A:
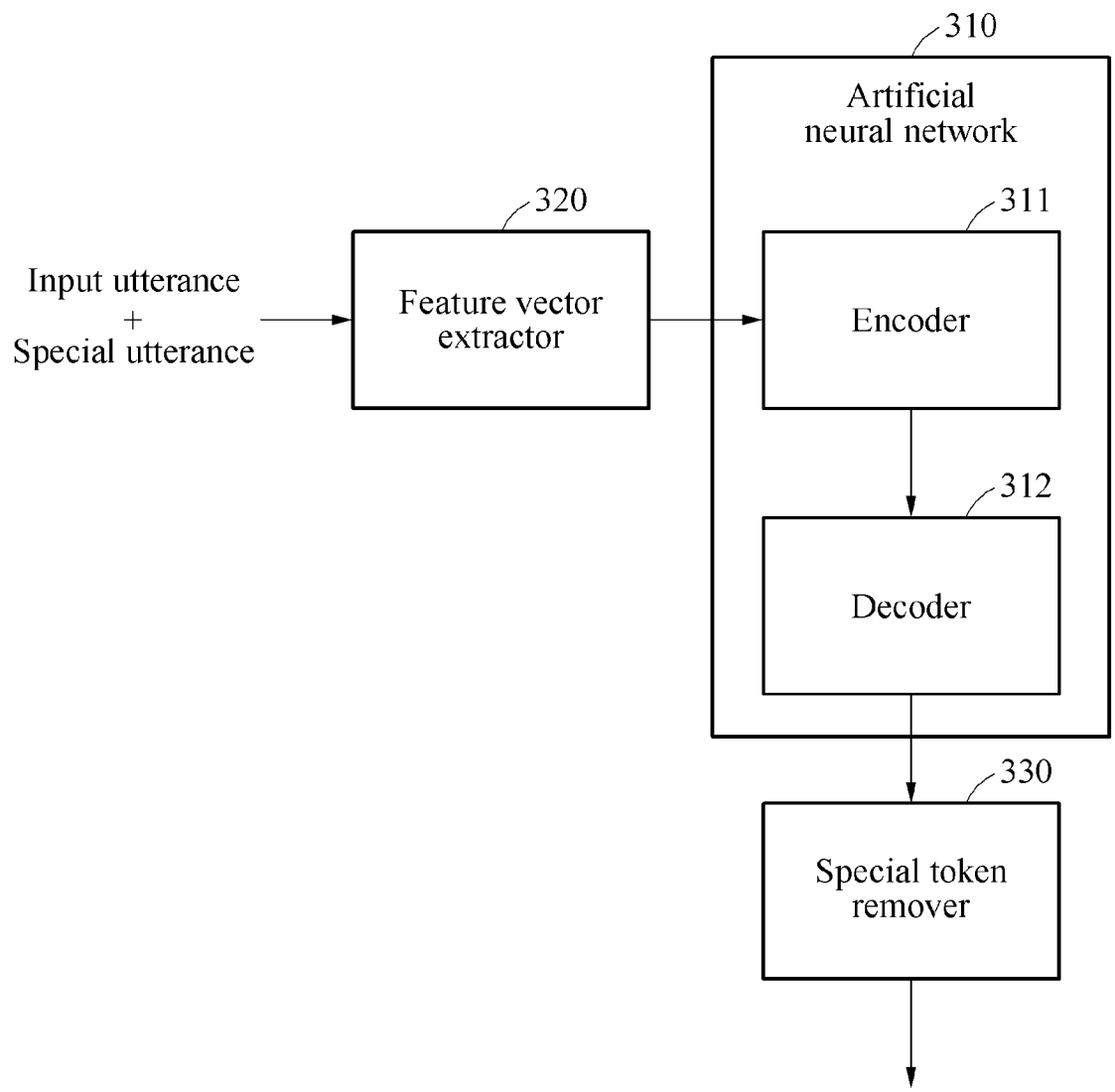
FIG. 3A illustrates an example of a speech recognition apparatus.

FIG. 3A illustrates an example of a speech recognition apparatus.

Referring to FIG. 3A, a speech recognition apparatus includes an artificial neural network 310, a feature vector extractor 320, and a special token remover 330. Although only relevant components are illustrated in the example of FIG. 3A, other generally used components may be further included in addition to the components illustrated in FIG. 3A. In addition, the illustrated components of the speech recognition apparatus may be divided functionally and logically, and thus they may not be necessarily separate physical components or separate codes. Thus, at least one of the illustrated components may be embodied in an integral form in an actual physical environment. Hereinafter, each of the illustrated components of the speech recognition apparatus will be described in detail.

When the speech recognition apparatus receives an input utterance of a speaker, the speech recognition apparatus adds a preset special utterance to a front end of the input utterance of the speaker. The special utterance refers to an utterance forcefully added to a front end of an input utterance for speech recognition, and is clearly recognizable by the speech recognition apparatus and is obtained in advance, for example, in a registration process. Herein, the preset special utterance may not necessarily be a special utterance of the speaker.

The feature vector extractor 320 extracts an input feature vector from the input utterance received from the speaker, and a special feature vector from the special utterance. An utterance or speech may indicate herein a speech signal including information for each frame, and a feature vector may be a sequence of information extracted from each at least one frame and represented by a multidimensional vector.

The artificial neural network 310 receives the input feature vector and the special feature vector from the feature vector extractor 320, and outputs a corresponding recognition result. The artificial neural network 310 may be an end-to-end artificial neural network of an encoder-decoder architecture including an encoder 311 and a decoder 312. The artificial neural network 310 may be embodied by, for example, an RNN, a CNN, an SANN, a BRNN, an LSTM network, a BLSTM network, a GRU, a BGRU, and the like. However, examples of the artificial neural network 310 are not limited to the examples described in the foregoing. Nodes of layers in the artificial neural network 310 may affect one another nonlinearly, and parameters of the artificial neural network 310 such as values output from the nodes, relationships among the nodes, and the like may be optimized through learning or training.

Such end-to-end encoder-decoder is of a network architecture in which the encoder 311 and the decoder 312 are integrated together. The end-to-end encoder-decoder may receive an input feature vector and a special feature vector, and generate a sequence of a recognition result. For example, the encoder 311 and the decoder 312 embodied in such end-to-end architecture may generate, directly from an input utterance, a recognition result corresponding to the input utterance. The encoder 311 and the decoder 312 may be trained in advance to generate a sequence of a recognition result from a received feature vector. For example, the encoder 311 and the decoder 312 may be trained in advance to generate a sequence of a recognition result from a sequence of a pair of correct texts corresponding to an input utterance.

As illustrated in FIG. 3A, the encoder 311 generates an encoded feature by encoding a received feature vector, for example, the input feature vector and the special feature vector. The encoder 311 generates encoded information by extracting a feature from the feature vector. For example, the encoder 311 generates the encoded information by transforming a dimension of the feature vector.

The encoded feature is applied to the decoder 312. The decoder 312 generates a recognition result based on the encoded feature. The decoder 312 receiving the encoded feature outputs the recognition result by each token, and a token may be a word, a subword, a character, or a unit included in the character (e.g., consonant and vowel in a Korean orthographic syllable).

The decoder 312 obtains an output token based on information calculated from the encoder 311 in each step. The output token is obtained dependent on input tokens selected until a previous step. In an end-to-end artificial neural network model performing autoregressive decoding, a token selected as an output token may be determined to be a subsequent input token. When the decoder 312 outputs a subsequent token in each step, the decoder 312 uses an output token, which is previously output. For example, to recognize "a human" in a sentence "I am a human," the decoder 312 uses an output "I am." In this example, such characteristic may be autoregressive.

The decoder 312 outputs at least one special token corresponding to the special utterance based on a start token which is an input token, and on the encoded feature. The special token may be a text corresponding to the special utterance.

The decoder 312 outputting the special token predicts probabilities of candidates for a subsequent output token based on the special token. A conditional probability of a token $t_i$ in a step i may be represented by Equation 1.

$$p(t_i|t_1,t_2,\ldots,t_{i-1},H_e)$$ [Equation 1]

In Equation 1, $H_e$ denotes a feature encoded by hidden representation, $t_1$ through $t_{i-1}$ denote input tokens selected up to a current point in time, and $t_i$ denotes a special token. As represented by Equation 1, the decoder 312 determines a subsequent output token based on the special token, and thus subsequently output tokens may be biased by an utterance of the speaker. Thus, the speech recognition apparatus may focus on an utterance of a main speaker. Here, prevention of an output of noise may also be affected by the special token, and such result may be obtained even though the special token does not correspond to an utterance of the speaker.

The special token remover 330 removes the special token from the recognition result including the special utterance, and finally outputs a recognition result corresponding to only the input utterance.

Figure 3B:
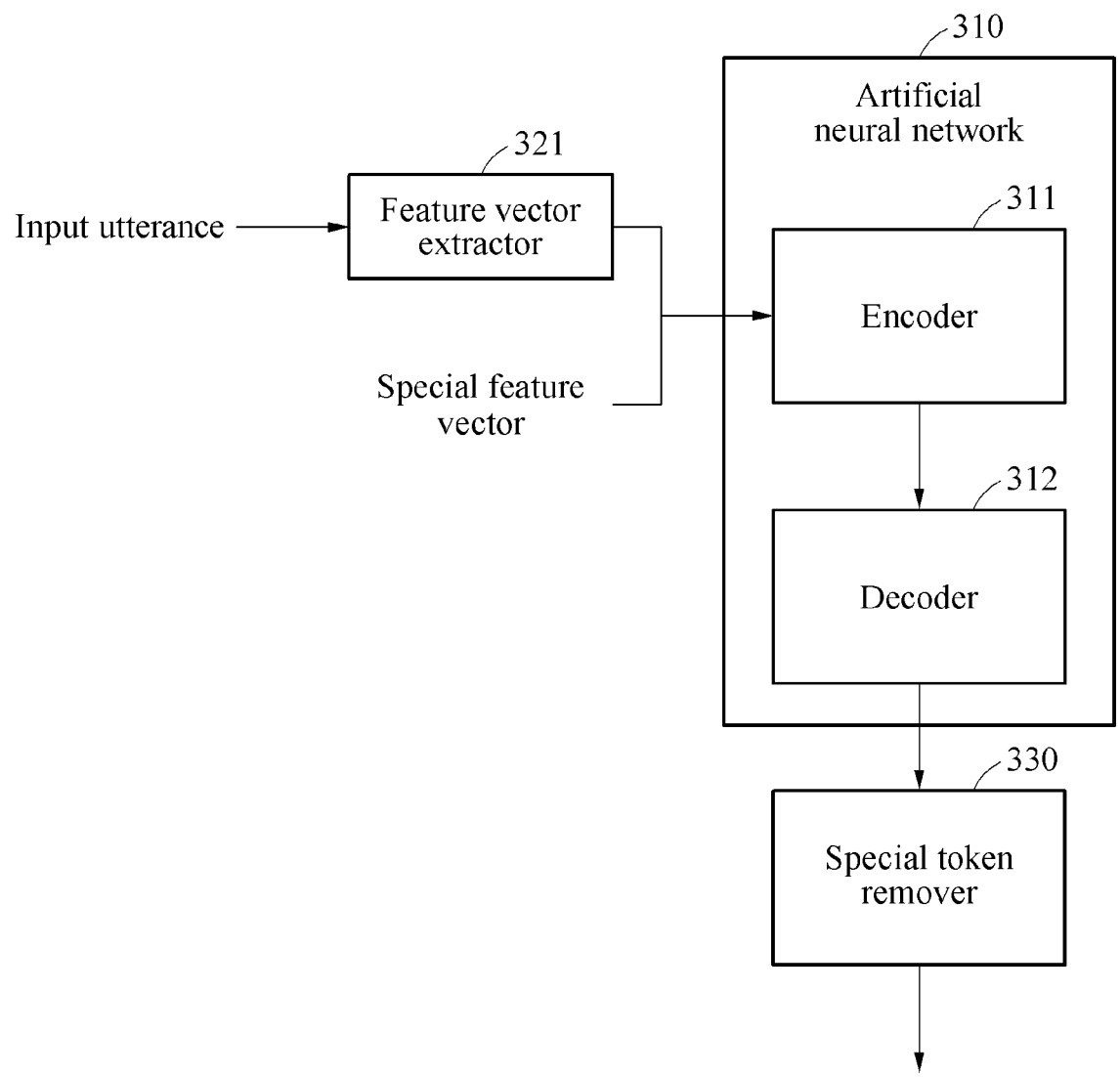
FIG. 3B illustrates an example of a speech recognition apparatus.

FIG. 3B illustrates another example of a speech recognition apparatus.

Referring to FIG. 3B, a speech recognition apparatus includes an artificial neural network 310, a feature vector extractor 321, and a special token remover 330. What is described above with reference to FIG. 3A is applicable hereto, and thus a repeated description is omitted here for increased conciseness and clarity.

The speech recognition apparatus adds a preset special feature vector to an input feature vector, instead of adding a special utterance to an input utterance of a speaker. The feature vector extractor 312 extracts the input feature vector from the input utterance received from the speaker. The speech recognition apparatus adds the preset special feature vector to the extracted input feature vector. The special feature vector may be obtained in advance in a registration process, and include a speech or utterance characteristic or feature of the speaker.

The artificial neural network 310 receives the input feature vector and the special feature vector from the feature vector extractor 320, and outputs a corresponding recognition result.

Figure 3C:
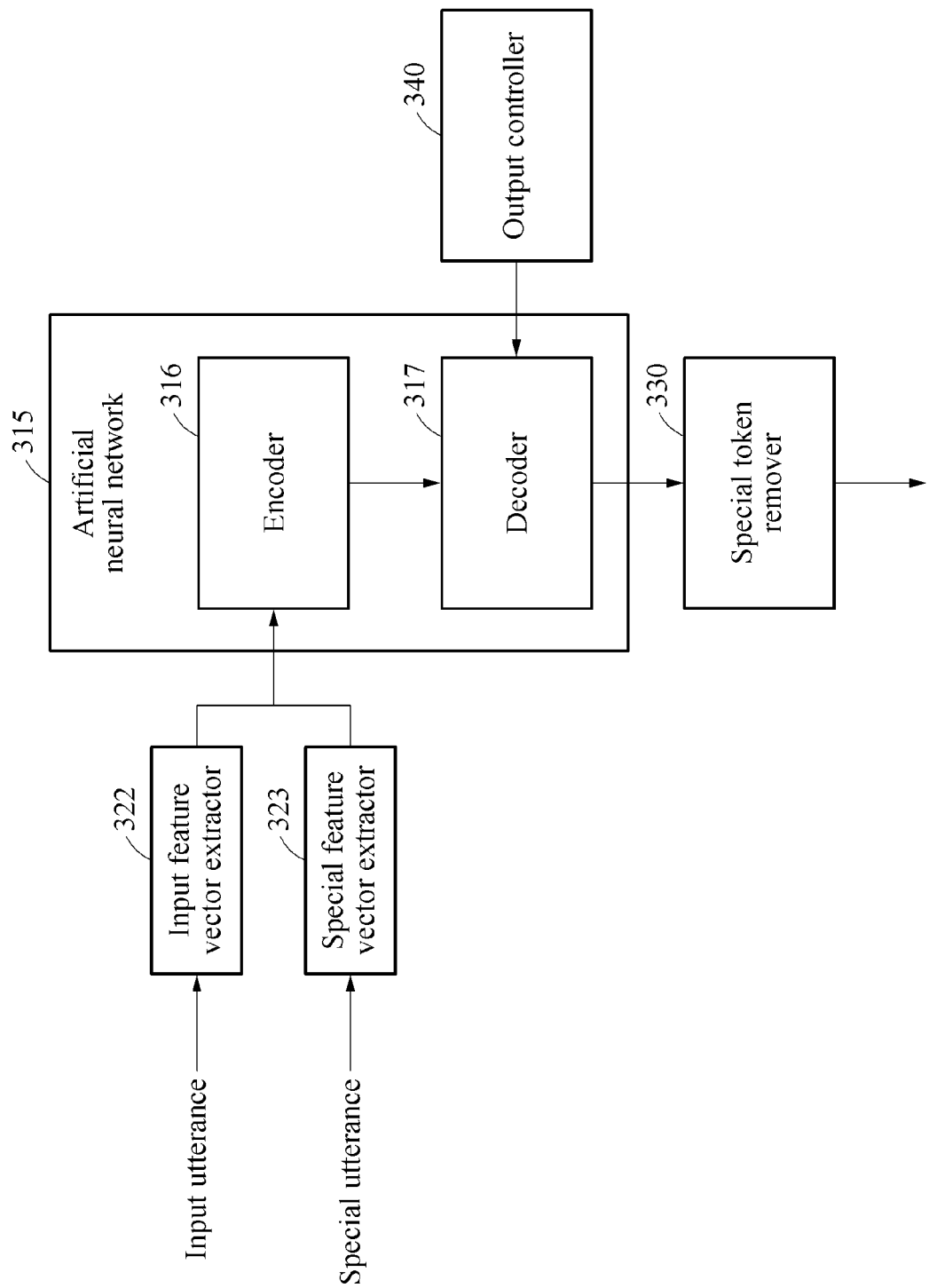
FIG. 3C illustrates an example of a speech recognition apparatus.

FIG. 3C illustrates another example of a speech recognition apparatus.

Referring to FIG. 3C, a speech recognition apparatus includes an artificial neural network 315, an input feature vector extractor 322, a special feature vector extractor 323, a special token remover 330, and an output controller 340.

The speech recognition apparatus may use different feature vector extractors for an input utterance and a special utterance. For example, the input feature vector extractor 322 extracts an input feature vector from the input utterance, and the special feature vector extractor 323 extracts a special feature vector from the special utterance. In addition, to increase efficiency in calculation or for other such purposes, the special feature extractor 323 may extract a feature vector in a different way from that applied to the feature vector extractor 320 illustrated in FIG. 3A. For example, the special feature vector extractor 323 extracts a special feature vector from a portion of the special utterance.

The artificial neural network 315 is an end-to-end artificial neural network of an encoder-decoder architecture including an encoder 316 and a decoder 317. The encoder 316 generates an encoded feature by encoding a received feature vector, for example, the input feature vector and the special feature vector, and applies the generated encoded feature to the decoder 317. The decoder 317 generates a recognition result based on the encoded feature.

The artificial neural network 315 is trained to output a special token when receiving the special feature vector. The special token described above with reference to FIGS. 3A and 3B may be a text corresponding to the special utterance.

However, the special token output by the decoder 317 may not a text corresponding to the special utterance, except that the special token includes only speaker information. For example, since the artificial neural network 310 is trained in advance to generate a sequence of a recognition result from a sequence of a pair of correct texts corresponding to an input utterance, the artificial neural network 310 may not need to additionally learn a special token corresponding to a special utterance. However, since the artificial neural network 315 receives a special feature vector that the artificial neural network 310 may not learn, the artificial neural network 315 may need to be trained to output a special token corresponding to a special feature vector when the artificial neural network 315 receives the special feature vector. Hereinafter, the special feature vector and the special token corresponding to the special feature vector that are described with reference to FIG. 3C will be referred to as a voice identity (ID) feature vector and a voice ID token, respectively, to distinguish them from the special feature vector and the special token described with reference to FIGS. 3A and 3B.

The artificial neural network 315 receiving the voice ID feature vector outputs the voice ID token. When the voice ID token is output, the output controller 340 applies a bias to speaker information in the voice ID token. The decoder 317 predicts probabilities of candidates for a subsequent output token based on the voice ID token in which the speaker information is biased. The decoder 317 predicts the probabilities of the candidates for the subsequent output token based on the voice ID token, and thus subsequently output tokens may be biased by an utterance of the speaker. Thus, the speech recognition apparatus may prevent an output of noise, and focus on an utterance of a main speaker.

The special token remover 330 removes the special token from a recognition result including the special utterance, and outputs a recognition result corresponding to only the input utterance.

Figure 4A:
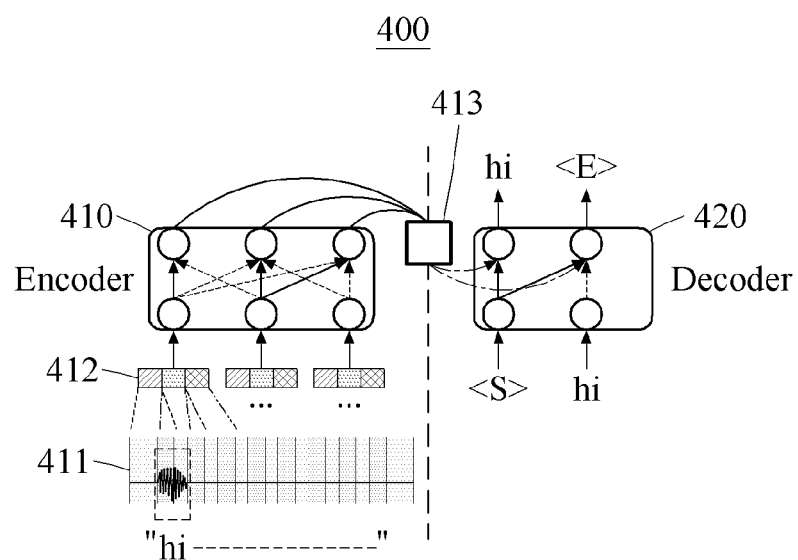
FIGS. 4A and 4B illustrate an example of an operation of a speech recognition apparatus including an end-to-end artificial neural network of an encoder-decoder architecture.
Figure 4B:
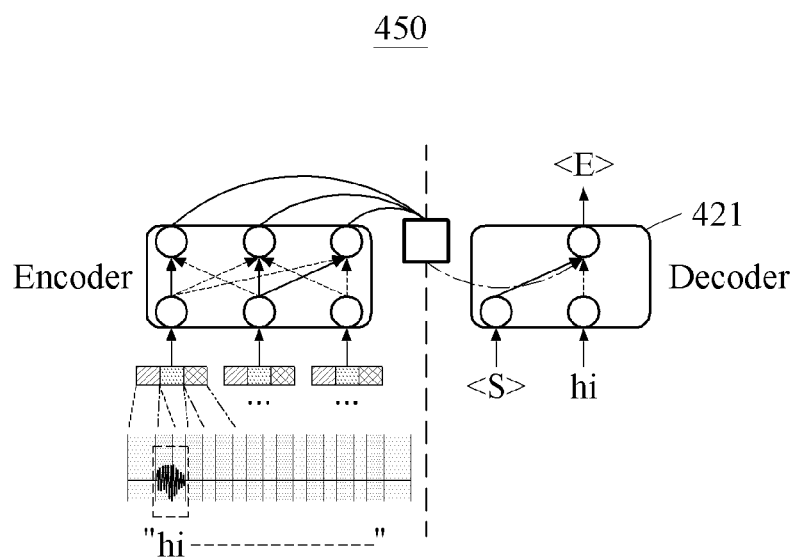

FIGS. 4A and 4B illustrate an example of an operation of a speech recognition apparatus including an end-to-end artificial neural network of an encoder-decoder architecture.

Referring to FIG. 4A, an artificial neural network 400 includes an encoder 410 and a decoder 420.

The artificial neural network 400 is an end-to-end artificial neural network of an encoder-decoder architecture that enables a path of simultaneously training all parameters with respect to a single loss function, and thus the encoder 410 and the decoder 420 may be trained simultaneously. The artificial neural network 400 receives an input at one end thereof and generates an output at the other end thereof, and optimizes a network weight based directly on the input and the output.

A speech recognition apparatus extracts a feature vector 412 from an utterance 411. The utterance 411 includes an input utterance and a special utterance. The feature vector 412 includes an input feature vector and a special feature vector. Hereinafter, the special utterance will be described as "hi" for convenience of description.

The encoder 410 generates an encoded feature 413 by encoding the feature vector 412. The encoder 410 generates encoded information by transforming a dimension of the encoded feature 413. The encoded feature 413 is applied to the decoder 420 of the artificial neural network 400. The decoder 420 determines an output token based on the encoded feature 413 and a previously determined recognition result.

The decoder 420 of the artificial neural network 400 decodes a start token which is an input token and the encoded feature 413, and outputs at least one special token "hi" corresponding to the special utterance. The decoder 420 outputting "hi" predicts probabilities of candidates for a subsequent output token based on the special token "hi," and determines a candidate having a highest probability among the candidates to be the subsequent output token. For example, when the decoder 420 determines "hi" to be the output token, the decoder 420 determines "hi" to be a subsequent input token.

Referring to FIG. 4B, in contrast to the decoder 420, a decoder 421 of an artificial neural network 450 skips a step of decoding the start token and the encoded feature 413 and outputting the at least one special token "hi" corresponding to the special utterance. The decoder 421 may not separately output the special token through the decoding, but have the special token beforehand and input the special token as a subsequent input token. The speech recognition apparatus may use a special token as a subsequent input token, and use the decoder 421 that directly inputs such pre-provided special token as the subsequent input token in order to output a same result as that obtained through the decoder 420. Thus, the speech recognition apparatus may increase efficiency in calculation. The artificial neural network 310 of FIG. 3A and the artificial neural network 315 of FIG. 3C may include the artificial neural network 450, in addition to the artificial neural network 400.

Figure 5A:
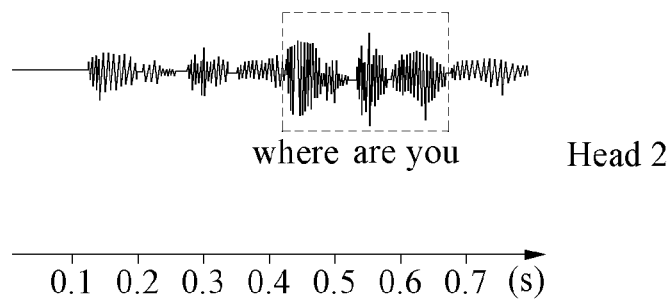
FIGS. 5A and 5B illustrate an example of focusing on an utterance of a main speaker by a speech recognition apparatus.
Figure 5B:
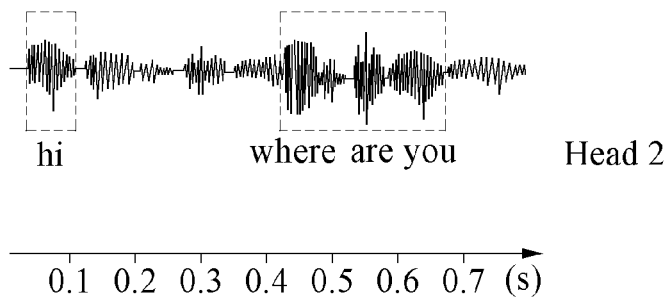

FIGS. 5A and 5B illustrate an example of focusing on an utterance of a main speaker by a speech recognition apparatus.

A speech recognition apparatus may receive an input utterance of another speaker, in addition to an input utterance of a main speaker. To distinguish another speaker from the main speaker, the other speaker will be referred to as a sub-speaker, and there may be one or more sub-speakers. For example, when speech recognition is performed in an environment in which a sound is from a television (TV), such TV sound may be input to the speech recognition apparatus. In this example, the TV sound may be a sound of a sub-speaker. Hereinafter, an example where an input utterance of a main speaker is "where are you" and an input utterance of a sub-speaker is "breaking news today prime min . . . " will be described for convenience of description.

Referring to FIG. 5A, a recognition result from a general speech recognition apparatus is illustrated by reference numeral 510. When the input utterance of the sub-speaker is input before the input utterance of the main speaker is input, the input utterance of the sub-speaker may be biased, and a text corresponding to the input utterance of the sub-speaker, for example, "breaking news today prime mini . . . ," may be output.

Referring to FIG. 5B, a recognition result from a speech recognition apparatus described herein is illustrated by reference numeral 520. Although the input utterance of the sub-speaker is input before the input utterance of the main speaker is input, the speech recognition apparatus may output a text corresponding to the input utterance of the main speaker by adding a special utterance corresponding to the main speaker before the input utterance of the sub-speaker is input. In an example, the speech recognition apparatus adds the special utterance corresponding to the main speaker to a front end of the input utterance of the sub-speaker, and outputs a recognition result "hi" corresponding to the special utterance. Subsequently, the speech recognition apparatus predicts probabilities of candidates for a subsequent output token based on the recognition result "hi." Thus, subsequently output tokens are biased by the input utterance of the main speaker. The speech recognition apparatus may focus on an utterance of the main speaker, and thus output a text "where are you" corresponding to the input utterance of the main speaker.

Figure 6:
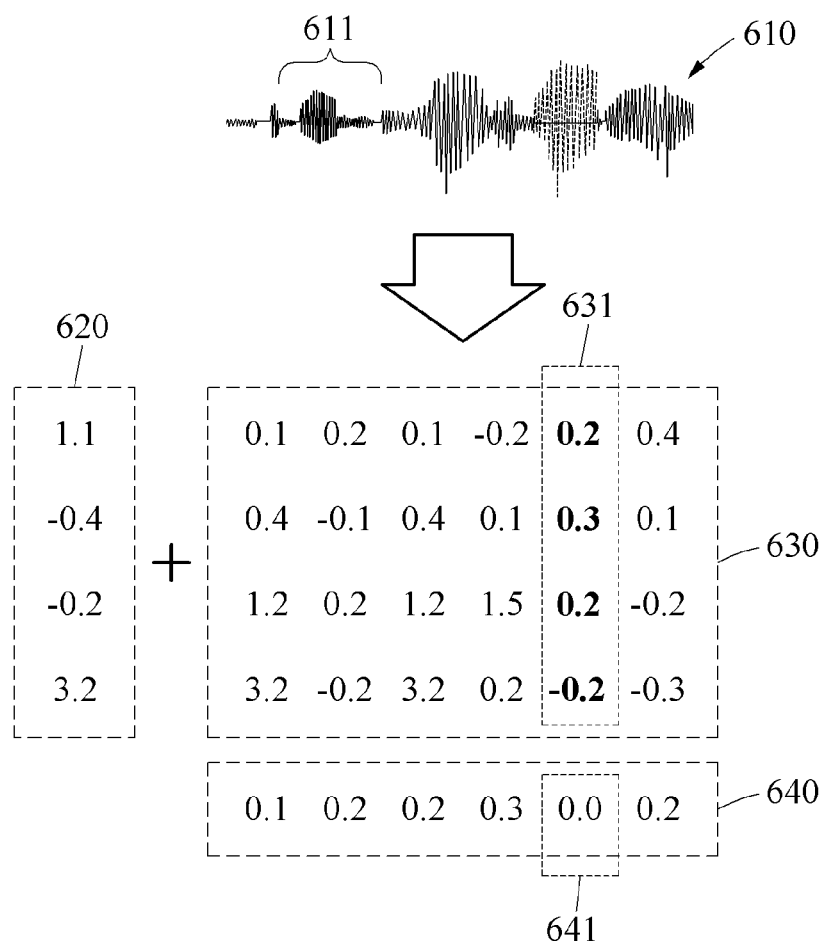
FIG. 6 illustrates an example of removing noise by a speech recognition apparatus.

FIG. 6 illustrates an example of removing noise by a speech recognition apparatus.

Referring to FIG. 6, a speech recognition apparatus receives an input utterance 610 including noise 611. The speech recognition apparatus adds a special feature vector 620 to a front end of an input feature vector 630. The input feature vector 630 includes a partial feature vector 631 corresponding to the noise.

The speech recognition apparatus outputs a special token corresponding to the special feature vector 620, and focuses on an utterance of a speaker based on an autoregressive characteristic. Thus, the noise may be disregarded and a text corresponding to the noise may not be output, as illustrated in a self-attention weight 640. In the entire self-attention weight 640, a specific self-attention weight 641 corresponding to the noise is 0.

Figure 7:
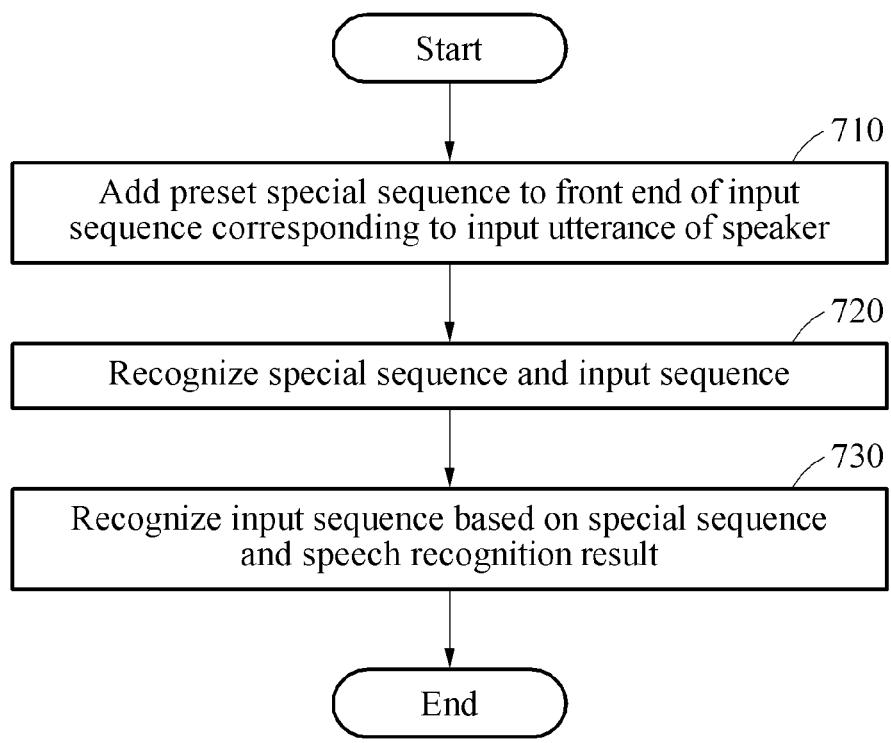
FIG. 7 illustrates a flowchart of an example of a speech recognition method.

FIG. 7 illustrates a flowchart of an example of a speech recognition method.

Operations 710 through 730 with reference to FIG. 7 may be performed by a speech recognition apparatus described above with reference to FIGS. 1 through 6. The speech recognition apparatus may be embodied by at least one hardware module, at least one software module, or various combinations thereof.

Referring to FIG. 7, in operation 710, the speech recognition apparatus adds a preset special sequence to a front end of an input sequence corresponding to an input utterance of a speaker. The input sequence may include the input utterance, or may include vectors extracted from the input utterance. The special sequence may include a preset utterance of the speaker, or at least one vector extracted from the preset utterance.

In operation 720, the speech recognition apparatus recognizes the special sequence and the input sequence. The speech recognition apparatus generates an encoded feature by encoding the special sequence and the input sequence, outputs at least one special token corresponding to the special sequence based on the generated encoded feature, and determines at least one output token corresponding to the input sequence based on the encoded feature and the special token. The special token may include a text corresponding to the preset utterance of the speaker.

The speech recognition apparatus generates an encoded feature by encoding the special sequence and the input sequence, and determines at least one output token corresponding to the input sequence based on the generated encoded feature and a special token corresponding to the special sequence.

The speech recognition apparatus inputs the special sequence and the input sequence to an end-to-end artificial neural network of an encoder-decoder architecture, and outputs a speech recognition result corresponding to the special sequence and the input sequence. The artificial neural network may output the speech recognition result dependent on a speech recognition result from previous steps based on information calculated by an encoder of the artificial neural network in each step.

In operation 730, the speech recognition apparatus recognizes the input sequence based on the special sequence and the speech recognition result. The speech recognition apparatus outputs a speech recognition result of recognizing the input sequence by excluding a speech recognition result corresponding to the special sequence from the speech recognition result corresponding to the special sequence and the input sequence.

Figure 8:
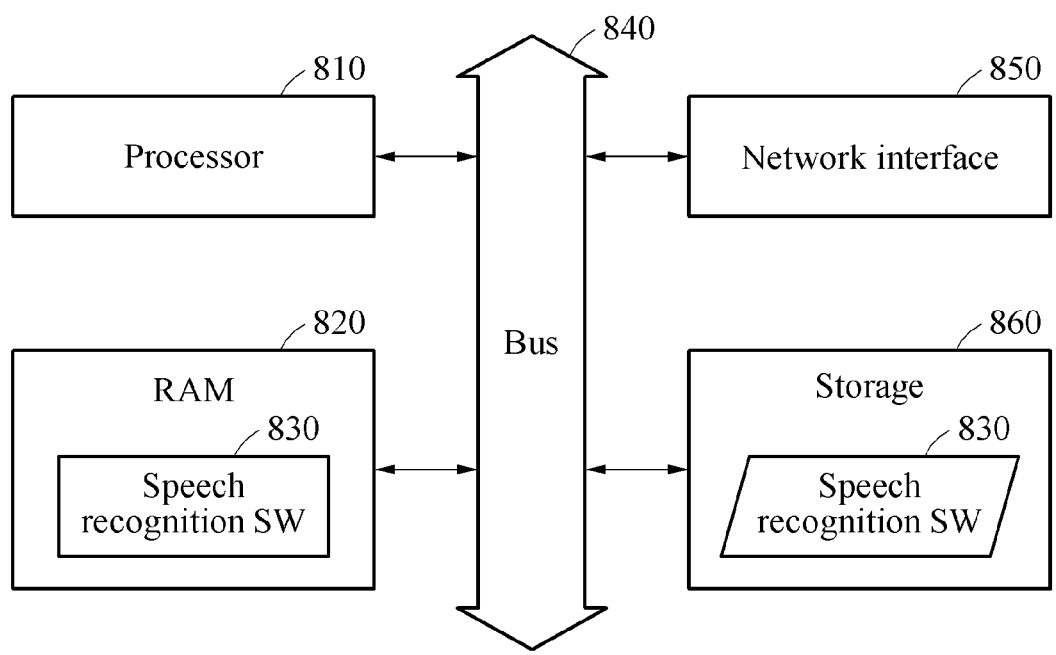
FIG. 8 illustrates an example of a hardware configuration of a speech recognition apparatus.

FIG. 8 illustrates an example of a hardware configuration of a speech recognition apparatus.

Referring to FIG. 8, a speech recognition apparatus includes at least one processor 810, a bus 840, a network interface 850, a memory 820 configured to load a computer program to be performed by the processor 810, and a storage 860 configured to store a speech recognition software (SW) 830.

The processor 810 may control an overall operation of each of the components of the speech recognition apparatus. The processor 810 may be embodied by including a central processing unit (CPU), a microprocessor unit (MPU), a microcontroller unit (MCU), a graphics processing unit (GPU), and other well-known types of processor in a relevant field of technology. In addition, the processor 810 may perform an operation of at least one application or program to perform the methods described above according to various examples. The speech recognition apparatus may include one or more processors.

The memory 820 may store various sets of data, instructions, and/or information. The memory 820 may load the speech recognition SW 830 from the storage 860 to perform the speech recognition method described herein according to various examples. The memory 820 may be provided as a random-access memory (RAM) as an example.

The bus 840 may provide a communication function for communication between the components of the speech recognition apparatus. The bus 840 may be embodied in various types, for example, an address bus, a data bus, a control bus, and the like.

The network interface 850 may support wired and wireless Internet communication of the speech recognition apparatus. In addition, the network interface 850 may support various communication methods in addition to the Internet communication. To this end, the network interface 850 may be embodied by including a well-known communication module in a relevant field of technology.

The storage 860 may non-temporarily store the speech recognition SW 830.

The storage 860 may be embodied by including a non-volatile memory such as a read-only memory (ROM), an erasable programmable ROM (EPROM), electrically EPROM (EEPROM), and a flash memory, or a hard disk, a removable disk, or other well-known computer-readable types of recoding medium.

The speech recognition SW 830 may construct an artificial neural network-based acoustic model by performing the speech recognition method described herein according to various examples, and output a final text in response to target speech or audio data to be recognized using the constructed acoustic model.

For example, the speech recognition SW 830 may be loaded into the memory 820. Through the speech recognition SW 830, the processor 810 may add a preset special sequence to a front end of an input sequence corresponding to an input utterance of the speaker, recognize the special sequence and the input sequence, and recognize the input sequence based on the special sequence and a speech recognition result obtained by recognizing the special sequence and the input sequence. In addition, the processor 810 may generate an encoded feature by encoding the special sequence and the input sequence, output a special token corresponding to the special sequence based on the generated encoded feature, and determine at least one output token corresponding to the input sequence based on the encoded feature and the special token. Alternatively, the processor 810 may generate an encoded feature by encoding the special sequence and the input sequence, and determine at least one output token corresponding to the input sequence based on the generated encoded feature and a special token corresponding to the special sequence. In addition, the processor 810 may input the special sequence and the input sequence to an end-to-end artificial neural network of an encoder-decoder architecture, and output a speech recognition result corresponding to the special sequence and the input sequence. In addition, the processor 810 may exclude a speech recognition result corresponding to the special sequence from the speech recognition result corresponding to the special sequence and the input sequence. In addition, the processor 810 may recognize an interval of the input sequence subsequence to the special sequence as an end of state (EOS) token. For example, in a case in which there is only noise in the input sequence, the processor 810 may recognize, as an EOS token, an interval after the special sequence, for example, an interval from 0 s to 0.3 s including only noise, as illustrated in the example of FIGS. 2A and 2B.

The speech recognition apparatus, and other apparatuses, units, modules, devices, and other components described herein with respect to FIGS. 1, 3A-3C, and 8 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2A-2B, 4A-4B, 5A-5B, 6, and 7 that perform the operations described herein are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition method comprising:
   receiving an input sequence that corresponds to an input utterance of a speaker;
   adding a preset special sequence to a front end of the input sequence;
   recognizing the preset special sequence and the input sequence using an artificial neural network; and
   recognizing the input sequence based on the preset special sequence and a recognition result obtained by the recognizing of the preset special sequence and the input sequence.

2. The speech recognition method of claim 1, wherein the input sequence includes the input utterance or vectors extracted from the input utterance.

3. The speech recognition method of claim 1, wherein the preset special sequence includes a preset utterance of the speaker, or at least one vector extracted from the preset utterance.

4. The speech recognition method of claim 1, wherein the preset special sequence is a preset utterance of the speaker.

5. The speech recognition method of claim 1, wherein the preset special sequence is "hi".

6. The speech recognition method of claim 1, wherein recognizing the preset special sequence and the input sequence comprises:
   generating an encoded feature by encoding the preset special sequence and the input sequence;
   outputting at least one special token that corresponds to the preset special sequence based on the encoded feature; and
   determining at least one output token that corresponds to the input sequence based on the encoded feature and the special token.

7. The speech recognition method of claim 6, wherein the special token includes a text corresponding to a preset utterance of the speaker.

8. The speech recognition method of claim 1, wherein recognizing the preset special sequence and the input sequence comprises:
   generating an encoded feature by encoding the preset special sequence and the input sequence; and
   determining at least one output token that corresponds to the input sequence based on the encoded feature and a special token that corresponds to the preset special sequence.

9. The speech recognition method of claim 1, wherein recognizing the preset special sequence and the input sequence comprises:
   outputting the recognition result that corresponds to the preset special sequence and the input sequence by inputting the preset special sequence and the input sequence to an end-to-end artificial neural network that has an encoder-decoder architecture.

10. The speech recognition method of claim 9, wherein a decoder of the end-to-end artificial neural network is configured to output the recognition result dependent on a recognition result from previous steps based on information calculated from an encoder of the end-to-end artificial neural network in each step.

11. The speech recognition method of claim 9, wherein the artificial neural network includes one or more of a recurrent neural network (RNN), a convolutional neural network (CNN), and a self-attention neural network (SANN).

12. The speech recognition method of claim 1, wherein recognizing the input sequence comprises:
   excluding a recognition result corresponding to the preset special sequence from the recognition result that corresponds to the preset special sequence and the input sequence.

13. The speech recognition method of claim 1, wherein the preset special sequence includes at least one feature vector extracted from a portion of a preset utterance of the speaker, and
   recognizing the preset special sequence and the input sequence comprises:
   generating an encoded feature by inputting the preset special sequence and the input sequence to an end-to-end artificial neural network that has an encoder-decoder architecture; and
   outputting a special token that corresponds to the feature vector based on the encoded feature,
   wherein the artificial neural network is configured to be trained to output the special token in response to the feature vector being input.

14. The speech recognition method of claim 1, wherein, in a case in which the input sequence includes only noise, the method further comprises:
   recognizing the input sequence subsequent to the preset special sequence as an end of state (EOS) token.

15. A non-transitory computer-readable storage medium storing instructions that, when executed by a processor, cause the processor to perform the speech recognition method of claim 1.

16. A speech recognition apparatus comprising:
   a processor configured to:
   receive an input sequence that corresponds to an input utterance of a speaker,
   add a preset special sequence to a front end of the input sequence,
   recognize the preset special sequence and the input sequence using an artificial neural network, and
   recognize the input sequence based on the preset special sequence and a recognition result obtained by the recognizing of the preset special sequence and the input sequence.

17. The speech recognition apparatus of claim 16, wherein the input sequence includes the input utterance or vectors extracted from the input utterance.

18. The speech recognition apparatus of claim 16, wherein the preset special sequence includes a preset utterance of the speaker, or at least one vector extracted from the preset utterance.

19. The speech recognition apparatus of claim 16, wherein the processor is configured to:
   generate an encoded feature by encoding the preset special sequence and the input sequence,
   output a special token that corresponds to the special sequence based on the encoded feature, and
   determine at least one output token that corresponds to the input sequence based on the encoded feature and the special token.

20. The speech recognition apparatus of claim 16, wherein the special token includes a text corresponding to a preset utterance of the speaker.

21. The speech recognition apparatus of claim 16, wherein the processor is configured to:
   generate an encoded feature by encoding the preset special sequence and the input sequence, and
   determine at least one output token that corresponds to the input sequence based on the generated encoded feature and a special token that corresponds to the preset special sequence.

22. The speech recognition apparatus of claim 16, wherein the processor is configured to input the preset special sequence and the input sequence to an end-to-end artificial neural network that has an encoder-decoder architecture, and output the recognition result that corresponds to the preset special sequence and the input sequence.

23. The speech recognition apparatus of claim 22, wherein a decoder of the end-to-end artificial neural network is configured to output the recognition result dependent on a recognition result from previous steps based on information calculated from an encoder of the end-to-end artificial neural network in each step.

24. The speech recognition apparatus of claim 22, wherein the artificial neural network includes one or more of a recurrent neural network (RNN), a convolutional neural network (CNN), and a self-attention neural network (SANN).

25. The speech recognition apparatus of claim 16, wherein the processor is configured to exclude a recognition result that corresponds to the preset special sequence from the recognition result that corresponds to the preset special sequence and the input sequence.

26. The speech recognition apparatus of claim 16, wherein the preset special sequence includes at least one feature vector extracted from a portion of a preset utterance of the speaker,
   wherein the processor is configured to generate an encoded feature by inputting the preset special sequence and the input sequence to an encoder of an end-to-end artificial neural network that has an encoder-decoder architecture, and output a special token that corresponds to the feature vector based on the encoded feature, and
   wherein the artificial neural network is configured to be trained to output the special token in response to the feature vector being received.

27. The speech recognition apparatus of claim 22, wherein, in a case in which the input sequence only includes noise, the processor is configured to recognize the input sequence subsequent to the preset special sequence as an end of state (EOS) token.

28. A processor-implemented speech recognition method comprising:
   extracting a feature vector from an utterance that includes an input utterance and a special utterance that is added prior to the input utterance;
   encoding the feature vector to generate an encoded feature;
   determining an output token based on the encoded feature and a previously determined recognition result;
   outputting a special token that corresponds to the special utterance as the output token;
   removing the special token from a recognition result that includes the special utterance; and
   outputting a current recognition result that only corresponds to the input utterance.

29. The processor-implemented speech recognition method of claim 28, further comprising decoding an input token and the encoded feature to output the special token.

30. A processor-implemented speech recognition method comprising:
   extracting a feature vector from an utterance that includes an input utterance and a special utterance that is added prior to the input utterance;
   encoding the feature vector to generate an encoded feature;
   determining an output token based on the encoded feature and a previously determined recognition result;
   outputting a special token that corresponds to the special utterance as the output token;
   predicting probabilities of candidates for a subsequent output token based on the special token;
   determining the subsequent output token based on the probabilities; and
   determining the subsequent output token to be a subsequent input token.

31. The processor-implemented speech recognition method of claim 28, wherein encoding the feature vector includes transforming a dimension of the feature vector to generate the encoded feature.

32. The processor-implemented speech recognition method of claim 28, further comprising:
   predicting probabilities of candidates for a subsequent output token based on the special token;
   determining the subsequent output token based on the probabilities; and
   determining the subsequent output token to be a subsequent input token.

33. The processor-implemented speech recognition method of claim 30, further comprising:
   removing the special token from a recognition result that includes the special utterance; and
   outputting a current recognition result that only corresponds to the input utterance.

\* \* \* \* \*